US010222614B2

(12) United States Patent
Kuzuhara et al.

(10) Patent No.: US 10,222,614 B2
(45) Date of Patent: Mar. 5, 2019

(54) HEAD-UP DISPLAY AND VEHICLE

(71) Applicant: Panasonic Intellectual Property Management Co., Ltd., Osaka (JP)

(72) Inventors: Satoshi Kuzuhara, Osaka (JP); Hiroaki Okayama, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 31 days.

(21) Appl. No.: 15/587,805

(22) Filed: May 5, 2017

(65) Prior Publication Data

US 2017/0242248 A1 Aug. 24, 2017

Related U.S. Application Data

(63) Continuation of application No. PCT/JP2015/005331, filed on Oct. 23, 2015.

(30) Foreign Application Priority Data

Nov. 19, 2014 (JP) .................................. 2014-234416

(51) Int. Cl.
*G02B 27/14* (2006.01)
*G02B 27/01* (2006.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
CPC ................................................. G02B 27/0101
(Continued)

(56) References Cited

U.S. PATENT DOCUMENTS 5,037,182 A * 8/1991 Groves ..................... B60R 1/12
359/630

5,249,081 A * 9/1993 Rogers ...................... G02B 5/04
359/633
(Continued)

FOREIGN PATENT DOCUMENTS

JP 4-247489 9/1992
JP 5-8661 1/1993
(Continued)

OTHER PUBLICATIONS

Extended European Search Report dated Mar. 6, 2018 in European Patent Application No. 15860468.6.
(Continued)

*Primary Examiner* — James Jones
(74) *Attorney, Agent, or Firm* — Wenderoth, Lind & Ponack, L.L.P.

(57) ABSTRACT

A refractive optical system is disposed in an optical path from a display surface to a viewing area and between a projection optical system and the viewing area. A housing receives a display device, the projection optical system, and the refractive optical system, and is provided with an opening. An opening cover has at least partially a curved portion, and is disposed in the opening so that light emitted from the display surface is incident on a convex side of the curved portion. When a light beam that is emitted from a center of the display surface and reaches a center of the viewing area is referred to as a reference light beam, a head-up display satisfies the following condition (1):

$$L2 \leq L1 \qquad (1)$$

where
L1 is a distance from an end on the anterior side of the observer of the refractive optical system to the opening cover, and
L2 is a distance from a position at which the reference light beam passes through the refractive optical system to the opening cover.

6 Claims, 8 Drawing Sheets

(51) Int. Cl.
*B60K 35/00* (2006.01)
*G06T 19/00* (2011.01)

(52) U.S. Cl.
CPC ............... *B60K 2350/2052* (2013.01); *B60K 2350/2056* (2013.01); *B60K 2350/2082* (2013.01); *B60K 2350/2086* (2013.01); *G02B 2027/011* (2013.01); *G02B 2027/013* (2013.01); *G02B 2027/0118* (2013.01); *G06T 19/006* (2013.01)

(58) Field of Classification Search
USPC ........................................................ 359/630
See application file for complete search history.

(56) References Cited

U.S. PATENT DOCUMENTS

| | | |
|---|---|---|
| 2004/0113866 A1 | 6/2004 | Aoki et al. |
| 2007/0229394 A1 | 10/2007 | Ishikawa et al. |
| 2008/0192358 A1* | 8/2008 | Watanabe .......... G02B 27/0101 359/633 |
| 2008/0238814 A1 | 10/2008 | Ishikawa et al. |

FOREIGN PATENT DOCUMENTS

| | | |
|---|---|---|
| JP | 5-341226 | 12/1993 |
| JP | 2004-130892 | 4/2004 |
| JP | 2007-148092 | 6/2007 |
| JP | 2007-272061 | 10/2007 |
| JP | 2008-195194 | 8/2008 |
| JP | 2008-268883 | 11/2008 |
| JP | 2012-58294 | 3/2012 |

OTHER PUBLICATIONS

International Search Report issued in International Application No. PCT/JP2015/005331 dated Dec. 28, 2015.

* cited by examiner

HEAD-UP DISPLAY AND VEHICLE

BACKGROUND

1. Technical Field

The present disclosure relates to a head-up display that allows an observer to view an image displayed on a display surface of a display device through a projection optical system as a virtual image.

2. Description of the Related Art

Unexamined Japanese Patent Publication No. 2007-272061 discloses a head-up display that is provided with a Fresnel lens and a concave mirror, magnifies an image displayed on a display surface using the Fresnel lens, and allows an observer to view the image as a virtual image. Unexamined Japanese Patent Publication No. H04-247489 discloses a head-up display that is provided with a long focal length lens, magnifies an image displayed on a display surface using the long focal length lens, and allows an observer to view the image as a virtual image.

SUMMARY

A head-up display according to the present disclosure includes a display device, a projection optical system, a refractive optical system, a housing, and an opening cover. The display device includes a display surface for displaying an image. The projection optical system projects an image displayed on the display surface onto a viewing area for an observer. The refractive optical system is disposed in an optical path from the display surface to the viewing area and between the projection optical system and the viewing area. The housing contains the display device, the projection optical system, and the refractive optical system, and is provided with an opening. The opening cover has at least partially a curved portion, and is disposed in the opening so that light emitted from the display surface is incident on a convex side of the curved portion. When a light beam that is emitted from a center of the display surface and reaches a center of the viewing area is referred to as a reference light beam, the head-up display satisfies the following condition (1)

$$L2 \leq L1 \tag{1}$$

where

L1 is a distance from an end on an anterior side of the observer of the refractive optical system to the opening cover, and L2 is a distance from a position at which the reference light beam passes through the refractive optical system to the opening cover.

The present disclosure provides a head-up display that is compact and capable of displaying a virtual image on a large screen.

DETAILED DESCRIPTION

Exemplary embodiments will now be described in detail with reference to the drawings. Unnecessary details, however, may be omitted. For example, detailed description of well-known matters and repeated description of substantially the same structure may be omitted. This is to avoid unnecessary redundancy in the following description and to facilitate understanding by those skilled in the art.

The inventor(s) provides the drawings and the following description to enable those skilled in the art to have a thorough understanding of the present disclosure, and these are not intended to limit the subject matter defined by the claims.

First Exemplary Embodiment

[1-1 Configuration]

[1-1-1 Overall Configuration of Head-up Display]

Specific exemplary embodiments and examples of head-up display 100 according to the present disclosure are described below with reference to the drawings.

Figure 1:
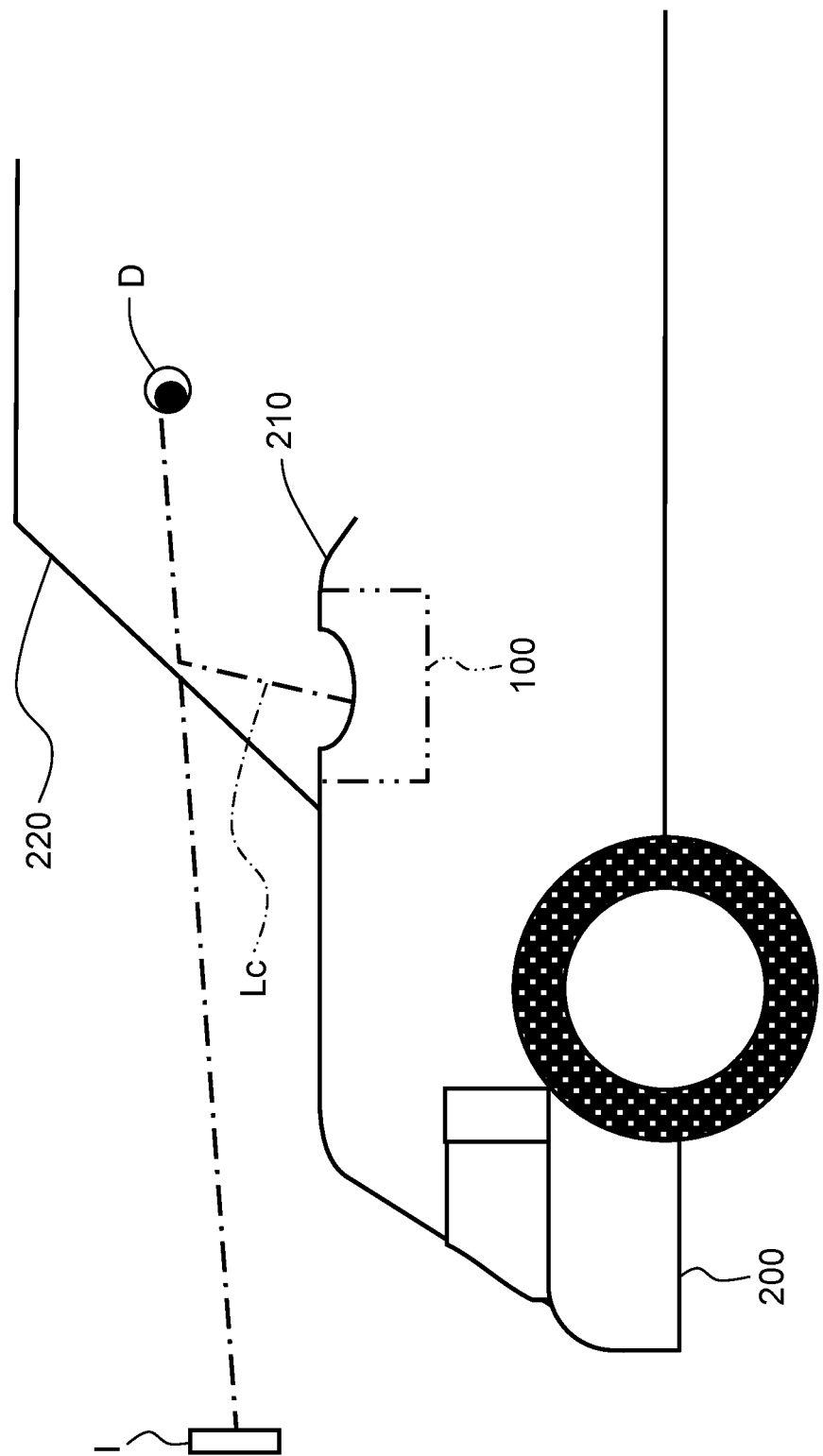
FIG. 1 is a schematic diagram of a vehicle equipped with a head-up display according to the present disclosure.

FIG. 1 is a schematic diagram of vehicle 200 equipped with head-up display 100 according to the present disclosure.

As illustrated in FIG. 1, head-up display 100 is disposed in dashboard 210 located below windshield 220 of vehicle 200.

Figure 2:
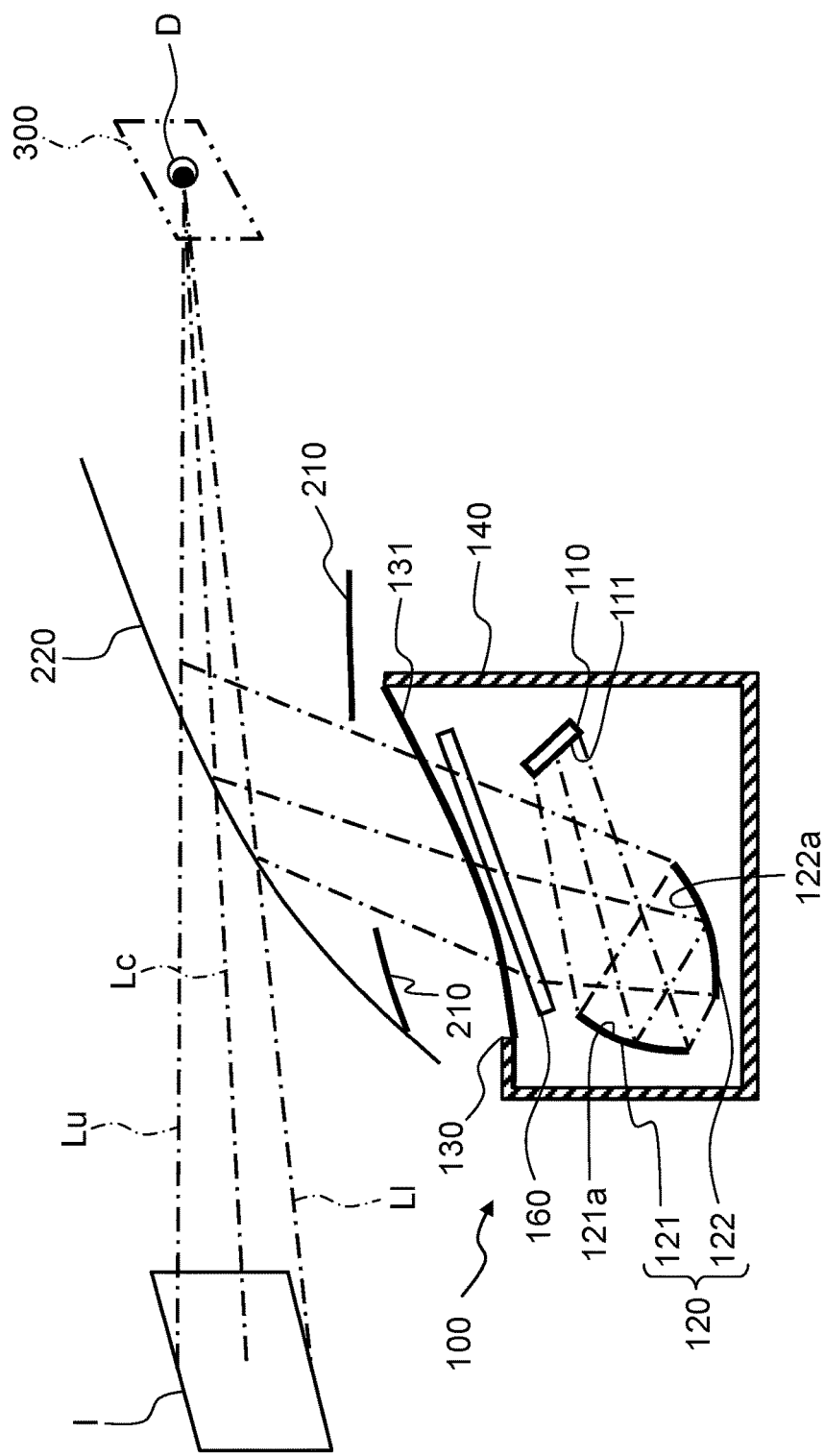
FIG. 2 is a schematic diagram illustrating a head-up display according to a first exemplary embodiment.

FIG. 2 is a schematic diagram illustrating head-up display 100 according to a first exemplary embodiment.

As illustrated in FIG. 2, head-up display 100 includes housing 140, refractive optical system 160, projection optical system 120, and display device 110. Housing 140 receives refractive optical system 160, projection optical system 120, and display device 110. Head-up display 100 allows observer D in vehicle 200 to view an image displayed on display surface 111 of display device 110 as virtual image I. The image displayed on display surface 111 is reflected by windshield 220, directed to viewing area 300 (sometimes referred to as an eye box) for observer D, and viewed as virtual image I by observer D.

Here, a light beam to form the upper end of virtual image I is referred to as light beam Lu, and a light beam to form the lower end of virtual image I is referred to as light beam Ll. A light beam to form the center of virtual image I (i.e., a light beam that is emitted from the center of display surface 111 and reaches the center of viewing area 300) is referred to as reference light beam Lc. The viewpoint of observer D is assumed to be in the center of viewing area 300.

Housing 140 is provided with opening 130. Opening 130 is provided with a transparent opening cover. This opening cover has a curved shape. Therefore, external light, such as, for example, sunlight reflected on the opening cover, is difficult to reach observer D. Lens shaped opening cover allows the magnification of virtual image I to be adjusted. Housing 140 is not essential in head-up display 100 according to the first exemplary embodiment, and dashboard 210 of vehicle 200 may be substituted for housing 140.

Projection optical system 120 includes first mirror 121 and second mirror 122. An image displayed on display surface 111 is reflected by first mirror 121, then reflected by second mirror 122, refracted through refractive optical system 160, and further reflected by windshield 220 to reach viewing area 300, and virtual image I is viewed by observer D. Here, viewing area 300 refers to a movable area of the eye where observer D can view entire virtual image I without missing part of virtual image I.

Display device 110 includes a liquid crystal display, a backlight unit including a light source, a diffusion plate, and a polarized lens, which are not shown. In display device 110, a controller such as, for example, a microcontroller (not shown) controls display image information. Display surface 111 can display various types of information, such as road guidance, distance to a vehicle in front, remaining capacity of a vehicle's battery, and current vehicle speed, as the display image information. Display device 110 is, for example, a liquid crystal display, organic light emitting diodes (electroluminescence), or a plasma display. A projector or a scanning laser can be used instead of a display device.

[1-1-2 Arrangement Configuration of Projection Optical System and Display Device]

Arrangement configuration of projection optical system 120 and display device 110 of head-up display 100 according to the first exemplary embodiment is described with reference to FIG. 2.

Display device 110 is disposed above second mirror 122 in housing 140. Display surface 111 of display device 110 is directed toward first mirror 121. Here, display device 110 is preferably disposed such that reference light beam Lc emitted from display surface 111 is inclined with respect to display surface 111. This prevents stray light caused by external light entering housing 140 and being reflected by display surface 111 of display device 110.

Reflective surface 121a of first mirror 121 is oriented in the direction in which an image to be displayed on display surface 111 is reflected in second mirror 122. Reflective surface 121a of first mirror 121 is also eccentric so that the image to be displayed on display surface 111 is reflected in second mirror 122.

Here, a reflective area of second mirror 122 is greater than a reflective area of first mirror 121 in order to enlarge the image displayed on display surface 111 and to display the image as virtual image I. The reflective area is the area of a mirror to reflect incident light, and as the reflective area is greater, the mirror becomes larger.

Second mirror 122 is disposed horizontally vehicle rearward of housing 140. Reflective surface 122a of second mirror 122 is eccentrically disposed such that reflective light from first mirror 121 is incident on windshield 220.

In the first exemplary embodiment, first mirror 121 is a mirror whose reflective surface 121a has a concave shape and a free-form surface shape. Second mirror 122 is also a mirror whose reflective surface 122a has a concave shape and a free-form surface shape. Concave reflective surface 122a of second mirror 122 can properly correct image distortion (i.e., image distortion in which the image displayed on display surface 111 is asymmetrically and eccentrically distorted) occurring in first mirror 121. Concave reflective surfaces 121a, 122a of first mirror 121 and second mirror 122 allow observer D to view virtual image I magnified as compared to the image displayed on display surface 111. Alternatively, the reflective surface of one of first mirror 121 and second mirror 122 may have a free-form surface shape, and the reflective surface of the other may have a planar shape or a convex shape.

Additionally, concave reflective surfaces 121a, 122a of first mirror 121 and second mirror 122 can distribute power owned by a single mirror, thereby reducing distortion aberration sensitivity in assembling.

First mirror 121 uses a free-form surface shape as reflective surface 121a. This is to correct the distortion of virtual image I caused by reflection and to allow for viewing good virtual image I over entire viewing area 300.

Second mirror 122 uses a free-form surface shape as reflective surface 122a. This is to correct the distortion of virtual image I caused by reflection and to allow for viewing good virtual image I over entire viewing area 300.

While first mirror 121 for use in head-up display 100 according to the first exemplary embodiment is provided with reflective surface 121a having a rotationally asymmetric shape, reflective surface 121a may have a "saddle" surface shape in which the sign of curvature is different in the X and Y directions.

While second mirror 122 for use in head-up display 100 according to the first exemplary embodiment is provided with reflective surface 122a having a rotationally asymmetric shape, reflective surface 122a may have a "saddle" surface shape in which the sign of curvature is different in the X and Y directions.

[1-1-3 Arrangement Configuration of Refractive Optical System]

Arrangement of refractive optical system 160 is described below with reference to FIG. 3.

Figure 3:
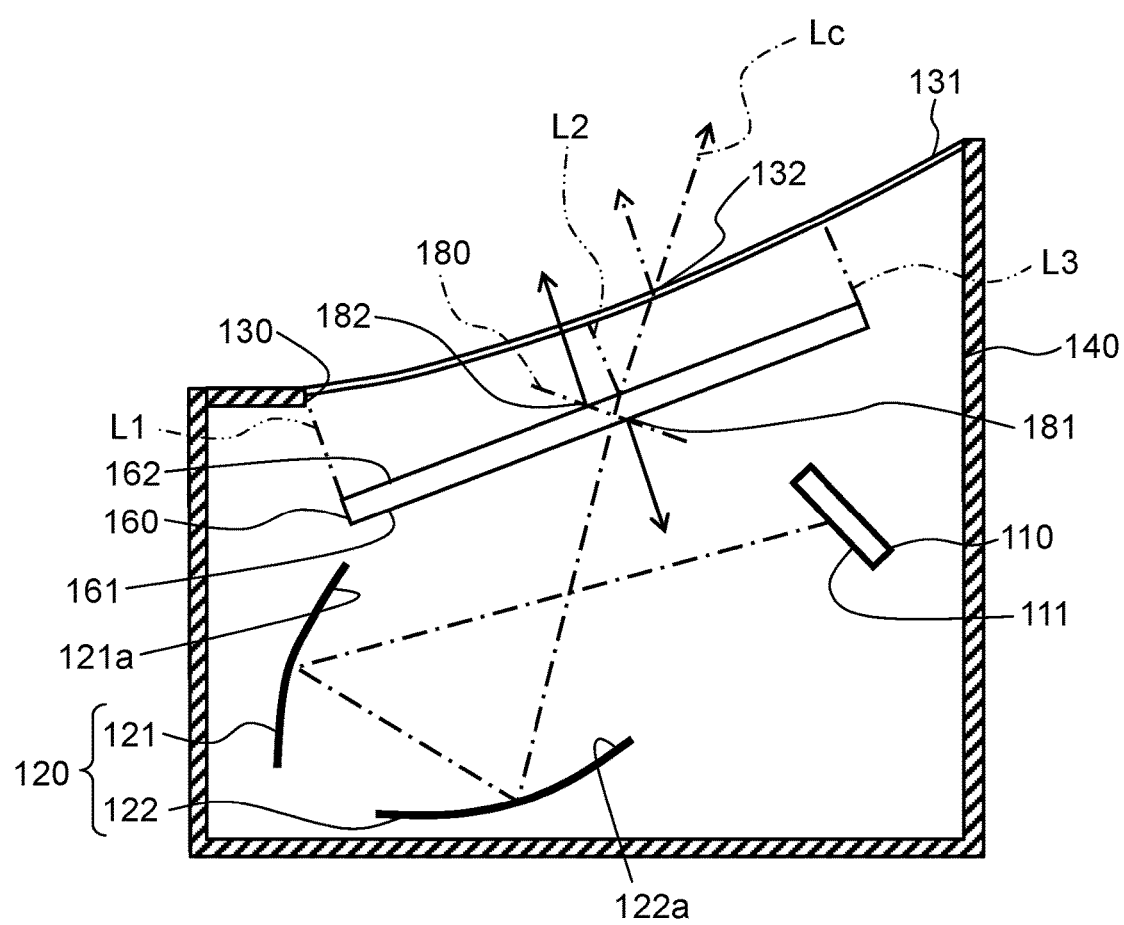
FIG. 3 is a diagram illustrating arrangement of a refractive optical system according to the first exemplary embodiment.

FIG. 3 is a diagram illustrating the arrangement of refractive optical system 160 according to the first exemplary embodiment.

As described above, opening 130 is provided with opening cover 131 having a curved shape in head-up display 100 according to the first exemplary embodiment. In order to prevent stray light caused by external light, opening cover 131 is disposed such that opening cover 131 closes opening 130 with a convex side on the inside of housing 140. While entire opening cover 131 has the curved shape in head-up display 100 according to the first exemplary embodiment, opening cover 131 may have at least partially a curved shape. Additionally, opening cover 131 only needs to be disposed over opening 130 so that light emitted from display surface 111 is incident on the convex side of a curved portion.

Refractive optical system 160 is disposed along opening cover 131.

As illustrated in FIG. 3, auxiliary plane 180 perpendicular to reference light beam Lc emitted from refractive optical system 160 is given. Intersection of auxiliary plane 180 with incident surface 161 of refractive optical system 160 is referred to as incident intersection line 181. Intersection of auxiliary plane 180 with exit surface 162 of refractive optical system 160 is referred to as exit intersection line 182. Intersection of opening cover 131 with reference light beam Lc is referred to as auxiliary intersection point 132. The normal vector of auxiliary intersection point 132 is a normal vector to opening cover 131 at auxiliary intersection point 132 as shown in FIG. 3. The normal vector to incident surface 161 at a point on incident intersection line 181 has a vector component opposite to the normal vector of auxiliary intersection point 132. On the other hand, the normal vector to exit surface 162 at a point on exit intersection line 182 has a vector component directed toward the direction of the normal vector of auxiliary intersection point 132.

Refractive optical system 160 is disposed so as to simultaneously satisfy the following conditions (1), (2)

$$L2 \leq L1 \quad (1)$$

$$L2 \leq L3 \quad (2)$$

where L1 is a distance from a left end that is an end of the vehicle forward of refractive optical system 160 (i.e., an end on the anterior side of an observer or on the left-hand side of the figure) to opening cover 131, L2 is a distance from a center portion through which reference light beam Lc passes to opening cover 131, and L3 is a distance from a right end that is an end on the vehicle rearward side (i.e., on the right-hand side of the figure) to opening cover 131.

This allows refractive optical system 160 to be disposed along opening cover 131 and housing 140 to be made smaller.

At least one of incident surface 161 and exit surface 162 of refractive optical system 160 has a convex shape. In this case, distance L1, distance L2, distance L3 from refractive optical system 160 to opening cover 131 are preferably distances from a smaller curvature surface to opening cover 131.

Refractive optical system 160 has at least one rotationally asymmetric surface shape. This is to correct asymmetric distortion aberration caused by refractive optical system 160 disposed along opening 130. While refractive optical system 160 has a continuous surface shape, a discontinuous surface shape with which a Fresnel lens is provided can make refractive optical system 160 smaller.

[1-2 Effects]

The depth dimension of housing 140 can be reduced by disposing refractive optical system 160 along opening 130. Thus, head-up display 100 having small-sized housing 140 and capable of displaying virtual image I on a large screen can be provided.

[1-3 Preferable Conditions]

Preferable conditions to be satisfied by head-up display 100 according to the first exemplary embodiment are described below. Note that a plurality of preferable conditions are defined for head-up display 100, and a configuration that satisfies all the plurality of conditions is most preferable. By satisfying each of individual conditions, however, head-up display 100 that provides each of the respective corresponding effects can be obtained.

Head-up display 100 according to the first exemplary embodiment includes display device 110 for displaying an image and a projection optical system 120 for projecting the image displayed on display device 110. Projection optical system 120 includes first mirror 121 and second mirror 122 in order along an optical path from display device 110.

Head-up display 100 projects an image displayed on display surface 111 of display device 110 onto windshield 220 and allows observer D to view virtual image I. This allows observer D to view the image displayed on display surface 111 of display device 110 without obstructing the forward view of observer D.

In head-up display 100 according to the present disclosure, reflective surface 121a of first mirror 121 preferably has a free-form surface shape. This properly corrects image distortion occurring in windshield 220 and allows for viewing good virtual image I less distorted over entire viewing area 300.

In head-up display 100 according to the present disclosure, reflective surface 122a of second mirror 122 preferably has a free-form surface shape. This properly corrects image distortion occurring in windshield 220 and allows for viewing good virtual image I less distorted over entire viewing area 300.

In head-up display 100 according to the present disclosure, reflective surface 121a of first mirror 121 has a concave shape or a planar shape. This prevents distortion of virtual image I caused by reflection as compared to the case where reflective surface 121a of first mirror 121 has a convex shape.

In head-up display 100 according to the present disclosure, reflective surface 122a of second mirror 122 has a concave shape or a planar shape. This prevents distortion of virtual image I caused by reflection as compared to the case where reflective surface 122a of second mirror 122 has a convex shape.

In head-up display 100 according to the present disclosure, the contour of first mirror 121 is a trapezoid shape. This eliminates unnecessary area of first mirror 121 other than an area on which the image displayed on display surface 111 is reflected, and thus makes head-up display 100 smaller. The contour of first mirror 121 is not limited to a trapezoid shape, and the contour can be suitably changed according to the shape of an effective area.

At least one of incident surface 161 and exit surface 162 of refractive optical system 160 has a rotationally asymmetric free-form surface shape. Thus, asymmetric distortion aberration caused by refractive optical system 160 disposed along opening 130 can be properly corrected.

Refractive optical system 160 has a rotationally asymmetric free-form surface shape, with a curvature in the longitudinal direction of a vehicle preferably smaller than a curvature in the transverse direction of the vehicle. In this manner, the asymmetric distortion aberration caused by refractive optical system 160 disposed along opening 130 can be more properly corrected. However, even when all surfaces of refractive optical system 160 are rotationally symmetric, reflective surface 121a, 122a of first mirror 121 or second mirror 122 with a rotationally asymmetric free-form surface shape can also correct the asymmetric distortion aberration.

The surface shape of refractive optical system 160 is preferably a discontinuous shape, such as a Fresnel shape. This makes refractive optical system 160 smaller, and thus makes housing 140 smaller.

The surface shape of refractive optical system 160 is preferably a Fresnel shape having Fresnel grooves only in the longitudinal direction. This minimizes the degradation of image quality caused by scattering due to the Fresnel grooves and makes refractive optical system 160 smaller. Furthermore, even when refractive optical system 160 is disposed along opening 130, the scattering due to the Fresnel grooves does not increase.

Refractive optical system 160 is preferably disposed along opening 130. This allows housing 140 to be made smaller. However, refractive optical system 160 may be disposed as a member integral with opening 130.

Each of first mirror 121 and second mirror 122 has a rotationally asymmetric free-form surface shape, with a curvature in the longitudinal direction of a vehicle preferably smaller than a curvature in the transverse direction of the vehicle. In this manner, asymmetric distortion aberration caused by refractive optical system 160 disposed along opening 130 can be properly corrected.

In head-up display 100 of the present disclosure, at least one surface of refractive optical system 160 is preferably provided with anti-reflection coating for reducing reflection.

This prevents or reduces stray light caused by reflection on the refractive surface of refractive optical system 160.

Second Exemplary Embodiment

A second exemplary embodiment is described below. Components similar to those of the first exemplary embodiment are denoted by the same reference numerals, and configurations and functions similar to those of the first exemplary embodiment may not be described in detail.

[2-1 Configuration]

[2-1-1 Overall Configuration of Head-up Display]

Figure 4:
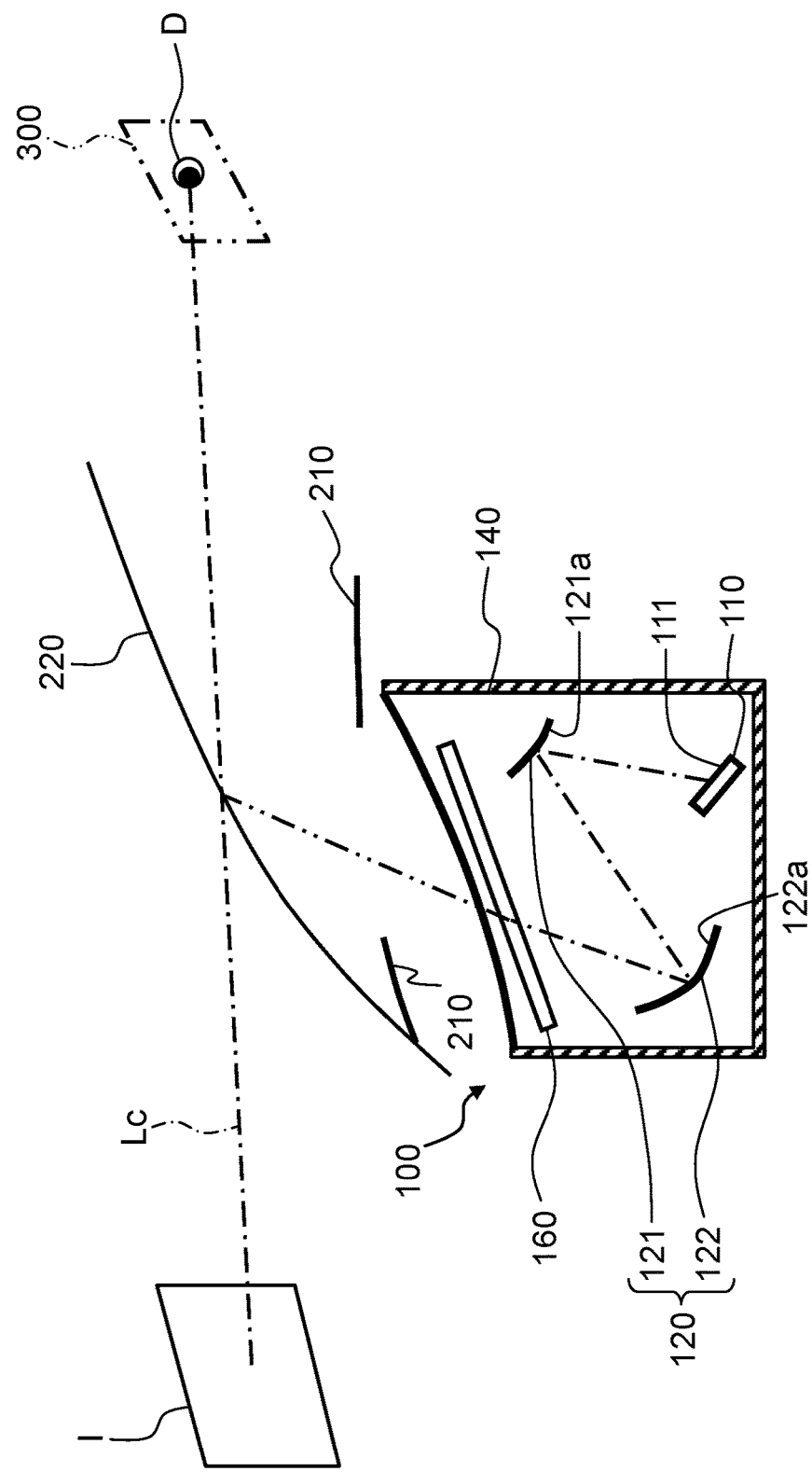
FIG. 4 is a schematic diagram illustrating a head-up display according to a second exemplary embodiment.

FIG. 4 is a schematic diagram illustrating head-up display 100 according to a second exemplary embodiment. As illustrated in FIG. 4, head-up display 100 is disposed in dashboard 210 located below windshield 220. Projection optical system 120 includes first mirror 121 and second mirror 122. An image displayed on display surface 111 of display device 110 is reflected by first mirror 121, then reflected by second mirror 122, refracted through refractive optical system 160, and further reflected by windshield 220. Thereafter, the image reaches viewing area 300 for observer D and is viewed as virtual image I by observer D.

[2-1-2 Arrangement Configuration of Projection Optical System and Display Device]

Display device 110 is disposed below first mirror 121 in housing 140. Display surface 111 of display device 110 is directed toward first mirror 121. Here, display device 110 is preferably disposed such that reference light beam Lc emitted from display surface 111 is inclined with respect to display surface 111. This prevents stray light caused by external light entering housing 140 and being reflected on display surface 111 of display device 110.

Reflective surface 121a of first mirror 121 is oriented in the direction in which the image displayed on display surface 111 is reflected in second mirror 122. Reflective surface 121a of first mirror 121 is also eccentric so that the image to be displayed on display surface 111 is reflected in second mirror 122.

Here, a reflective area of second mirror 122 is greater than a reflective area of first mirror 121 in order to enlarge the image displayed on display surface 111 and to display the image as virtual image I. The reflective area is the area of a mirror to reflect incident light, and as the reflective area is greater, the mirror becomes larger.

Second mirror 122 is disposed horizontally vehicle forward of first mirror 121 in housing 140. Reflective surface 122a of second mirror 122 is oriented in the direction in which reflective light from first mirror 121 is incident on windshield 220. Reflective surface 122a of second mirror 122 is also eccentric so that the reflective light from first mirror 121 is incident on windshield 220.

First mirror 121 is a mirror whose reflective surface 121a has a convex shape and a free-form surface shape. Second mirror 122 is a mirror whose reflective surface 122a has a concave shape and a free-form surface shape. Concave reflective surface 122a of second mirror 122 can properly correct image distortion (i.e., image distortion in which the image displayed on display surface 111 is asymmetrically and eccentrically distorted) occurring in first mirror. Concave reflective surface 122a of second mirror 122 allows observer D to view virtual image I magnified as compared to the image displayed on display surface 111. Alternatively, the reflective surface of one of first mirror 121 and second mirror 122 may have a free-form surface shape, and the reflective surface of the other may have a planar shape.

Additionally, convex reflective surfaces 121a, 122a of first mirror 121 and second mirror 122 can increase concave surface power of second mirror 122 and make housing 140 smaller.

First mirror 121 uses a free-form surface shape as reflective surface 121a. This is to correct the distortion of virtual image I caused by reflection and to allow for viewing good virtual image I over entire viewing area 300.

Second mirror 122 uses a free-form surface shape as reflective surface 122a. This is to correct the distortion of virtual image I caused by reflection and to allow for viewing good virtual image I over entire viewing area 300.

Third Exemplary Embodiment

A third exemplary embodiment is described below. Components similar to those of the above exemplary embodiments are denoted by the same reference numerals, and configurations and functions similar to those of the above exemplary embodiments may not be described in detail.

[3-1 Configuration]

[3-1-1 Overall Configuration of Head-up Display]

Figure 5:
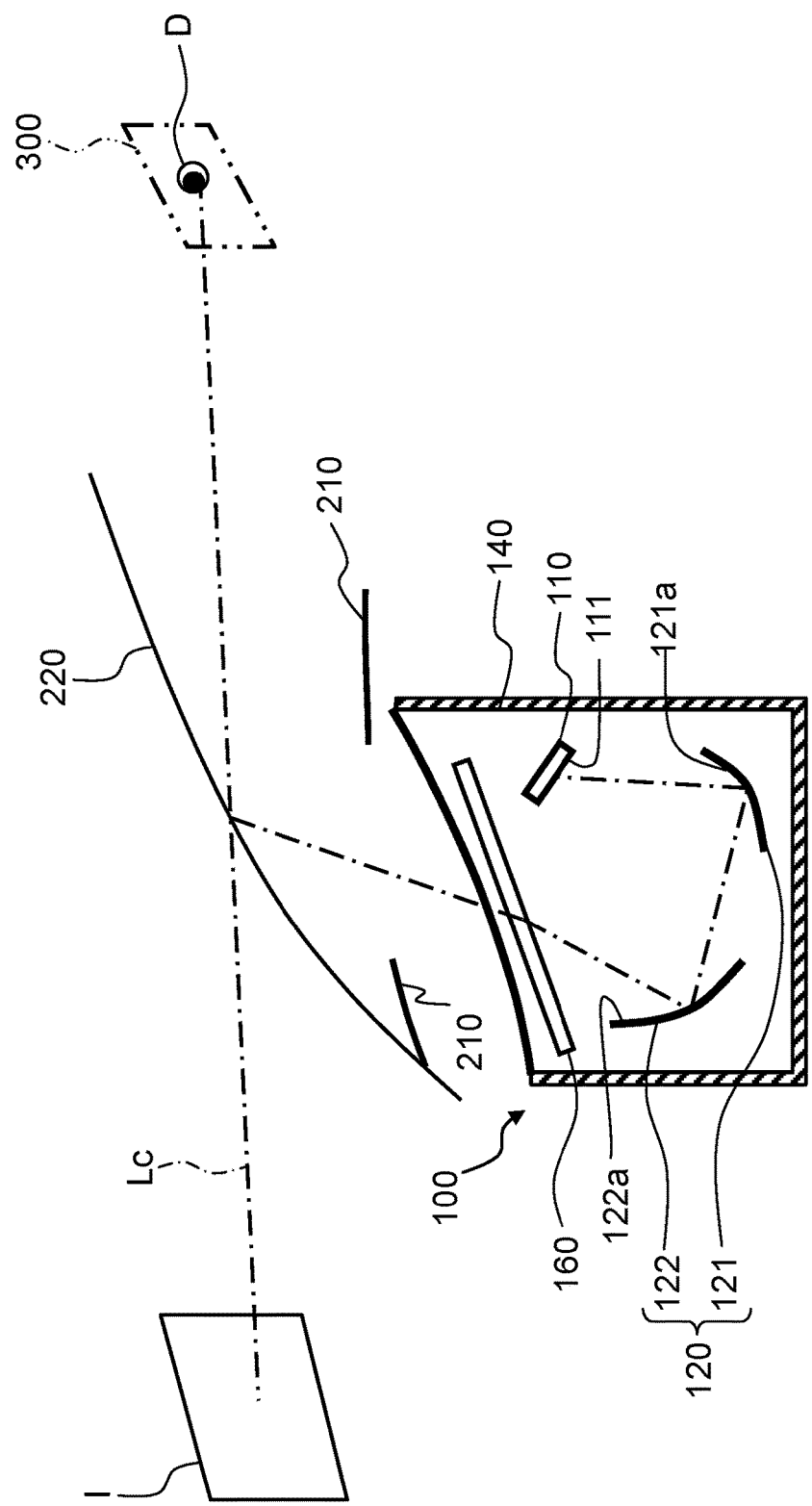
FIG. 5 is a schematic diagram illustrating a head-up display according to a third exemplary embodiment.

FIG. 5 is a schematic diagram illustrating head-up display 100 according to a third exemplary embodiment. As illustrated in FIG. 5, head-up display 100 is disposed in dashboard 210 located below windshield 220. Projection optical system 120 includes first mirror 121 and second mirror 122. An image displayed on display surface 111 of display device 110 is reflected by first mirror 121, then reflected by second mirror 122, refracted through refractive optical system 160, and further reflected by windshield 220. Thereafter, the image reaches viewing area 300 for observer D and is viewed as virtual image I by observer D.

[3-1-2 Arrangement Configuration of Projection Optical System and Display Device]

Display device 110 is disposed above first mirror 121 in housing 140. Display surface 111 of display device 110 is directed toward first mirror 121. This prevents display surface 111 (liquid crystal surface) of display device 110 from being exposed to sunlight. Here, display device 110 is preferably disposed such that reference light beam Lc emitted from display surface 111 is inclined with respect to display surface 111. This prevents stray light caused by external light entering housing 140 and being reflected on display surface 111 of display device 110.

Reflective surface 121a of first mirror 121 is oriented in the direction in which an image to be displayed on display surface 111 is reflected in second mirror 122. Reflective surface 121a of first mirror 121 is also eccentric so that the image to be displayed on display surface 111 is reflected in second mirror 122.

Here, a reflective area of second mirror 122 is greater than a reflective area of first mirror 121 in order to enlarge the image displayed on display surface 111 and to display the image as virtual image I. The reflective area is the area of a mirror to reflect incident light, and as the reflective area is greater, the mirror becomes larger.

Second mirror 122 is disposed horizontally vehicle forward of first mirror 121 in housing 140. Reflective surface 122a of second mirror 122 is oriented in the direction in which reflective light from first mirror 121 is incident on windshield 220. Reflective surface 122a of second mirror 122 is also eccentric so that the reflective light from first mirror 121 is incident on windshield 220.

First mirror 121 is a mirror whose reflective surface 121a has a concave shape and a free-form surface shape. Second mirror 122 is a mirror whose reflective surface 122a has a concave shape and a free-form surface shape. Concave reflective surface 121a of first mirror 121 can properly correct image distortion (i.e., image distortion in which the image displayed on display surface 111 is asymmetrically and eccentrically distorted) occurring in second mirror 122. Concave reflective surface 122a of second mirror 122 allows observer D to view virtual image I magnified as compared to the image displayed on display surface 111. Alternatively, the reflective surface of one of first mirror 121 and second mirror 122 may have a free-form surface shape, and the reflective surface of the other may have a planar shape. Otherwise, the reflective surface of one of first mirror 121 and second mirror 122 may have a concave shape, and the reflective surface of the other may have a convex shape.

Additionally, concave reflective surfaces 121a, 122a of first mirror 121 and second mirror 122 can distribute power owned by a single mirror, thereby reducing distortion aberration sensitivity in assembling.

First mirror 121 uses a free-form surface shape as reflective surface 121a. This is to correct the distortion of virtual image I caused by reflection and to allow for viewing good virtual image I over entire viewing area 300.

Second mirror 122 uses a free-form surface shape as reflective surface 122a. This is to correct the distortion of virtual image I caused by reflection and to allow for viewing good virtual image I over entire viewing area 300.

Fourth Exemplary Embodiment

A fourth exemplary embodiment is described below. Components similar to those of the above exemplary embodiments are denoted by the same reference numerals, and configurations and functions similar to those of the above exemplary embodiments may not be described in detail.

[4-1 Configuration]

[4-1-1 Overall Configuration of Head-up Display]

Figure 6:
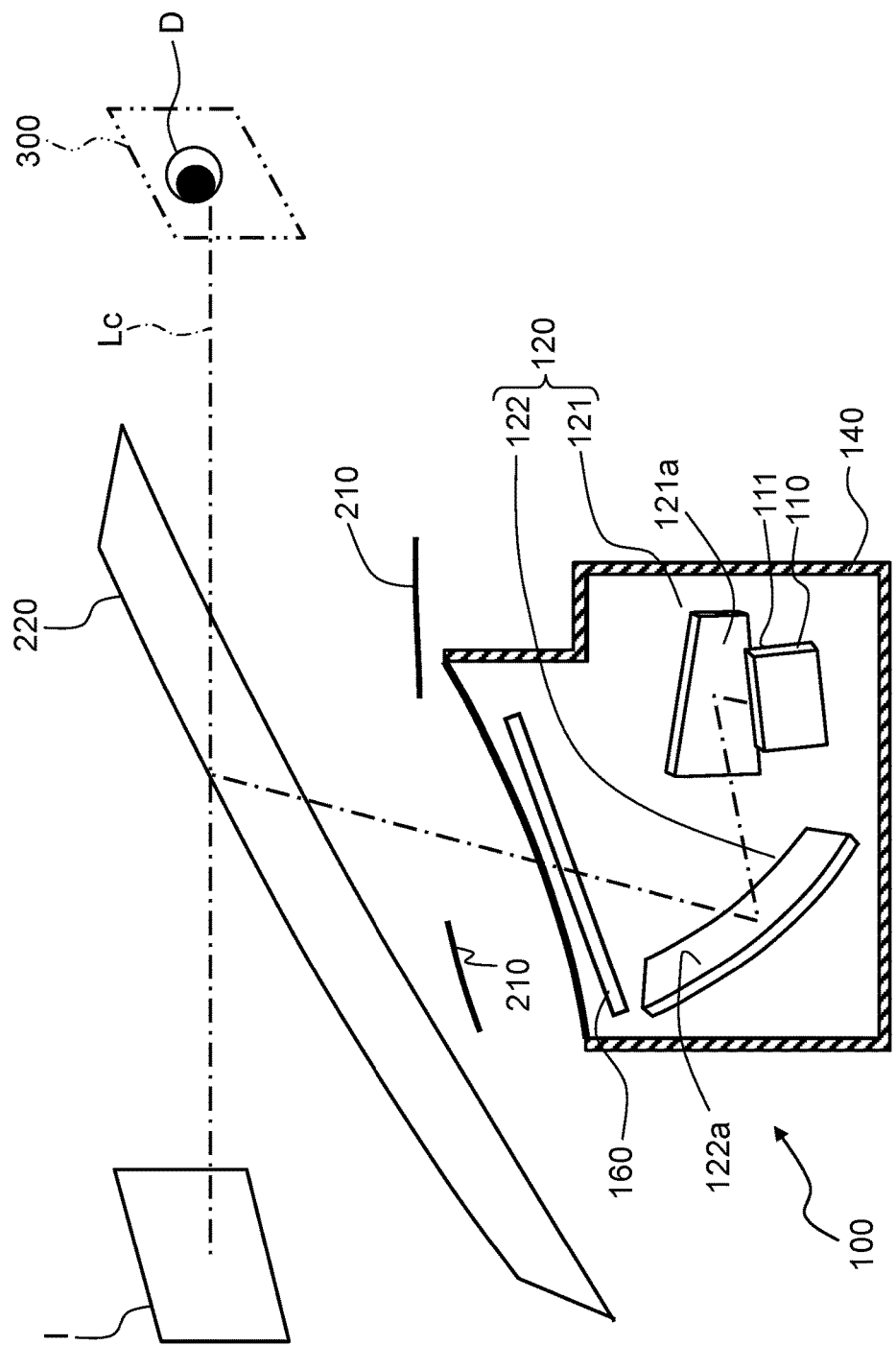
FIG. 6 is a schematic diagram illustrating a head-up display according to a fourth exemplary embodiment.

FIG. 6 is a schematic diagram illustrating head-up display 100 according to a fourth exemplary embodiment, where part of FIG. 6 is a projection view for the sake of simplicity. As illustrated in FIG. 6, head-up display 100 is disposed in dashboard 210 located below windshield 220. Projection optical system 120 includes first mirror 121 and second mirror 122. An image displayed on display surface 111 of display device 110 is reflected by first mirror 121, then reflected by second mirror 122, refracted through refractive optical system 160, and further reflected by windshield 220. Thereafter, the image reaches viewing area 300 for observer D and is viewed as virtual image I by observer D.

[4-1-2 Arrangement Configuration of Projection Optical System and Display Device]

Display device 110, first mirror 121, and second mirror 122 are disposed such that at least respective parts of display device 110, first mirror 121, and second mirror 122 are in the same horizontal plane.

Display surface 111 of display device 110 is directed toward first mirror 121. This prevents display surface 111 (liquid crystal surface) from being exposed to sunlight. Here, display device 110 is preferably disposed such that reference light beam Lc emitted from display surface 111 is inclined with respect to display surface 111. This prevents stray light caused by external light entering housing 140 and being reflected on display surface 111 of display device 110.

Reflective surface 121a of first mirror 121 is oriented in the direction in which an image to be displayed on display surface 111 is reflected in second mirror 122. Reflective surface 121a of first mirror 121 is also eccentric so that the image to be displayed on display surface 111 is reflected in second mirror 122.

Here, a reflective area of second mirror 122 is greater than a reflective area of first mirror 121 in order to enlarge the image to be displayed on display surface 111 and to display the image as virtual image I. The reflective area is the area of a mirror to reflect incident light, and as the reflective area is greater, the mirror becomes larger.

Second mirror 122 is disposed horizontally vehicle forward of first mirror 121 in housing 140. Reflective surface 122a of second mirror 122 is oriented in the direction in which reflective light from first mirror 121 is incident on windshield 220. Reflective surface 122a of second mirror 122 is also eccentric so that the reflective light from first mirror 121 is incident on windshield 220.

First mirror 121 is a mirror whose reflective surface 121a has a convex shape and a free-form surface shape. Second mirror 122 is a mirror whose reflective surface 122a has a concave shape and a free-form surface shape. Concave reflective surface 122a of second mirror 122 can properly correct image distortion (i.e., image distortion in which the image displayed on display surface 111 is asymmetrically and eccentrically distorted) occurring in first mirror 121. Concave reflective surface 122a of second mirror 122 allows observer D to view virtual image I magnified as compared to the image displayed on display surface 111. Alternatively, the reflective surface of one of first mirror 121 and second mirror 122 may have a free-form surface shape, and the reflective surface of the other may have a planar shape.

Additionally, convex reflective surfaces 121a, 122a of first mirror 121 and second mirror 122 can increase concave surface power of second mirror 122 and make housing 140 smaller.

First mirror 121 uses a free-form surface shape as reflective surface 121a. This is to correct the distortion of virtual image I caused by reflection and to allow for viewing good virtual image I over entire viewing area 300.

Second mirror 122 uses a free-form surface shape as reflective surface 122a. This is to correct the distortion of virtual image I caused by reflection and to allow for viewing good virtual image I over entire viewing area 300.

Fifth Exemplary Embodiment

A fifth exemplary embodiment is described below. Components similar to those of the above exemplary embodiments are denoted by the same reference numerals, and configurations and functions similar to those of the above exemplary embodiments may not be described in detail.

[5-1 Configuration]

[5-1-1 Overall Configuration of Head-up Display]

Figure 7:
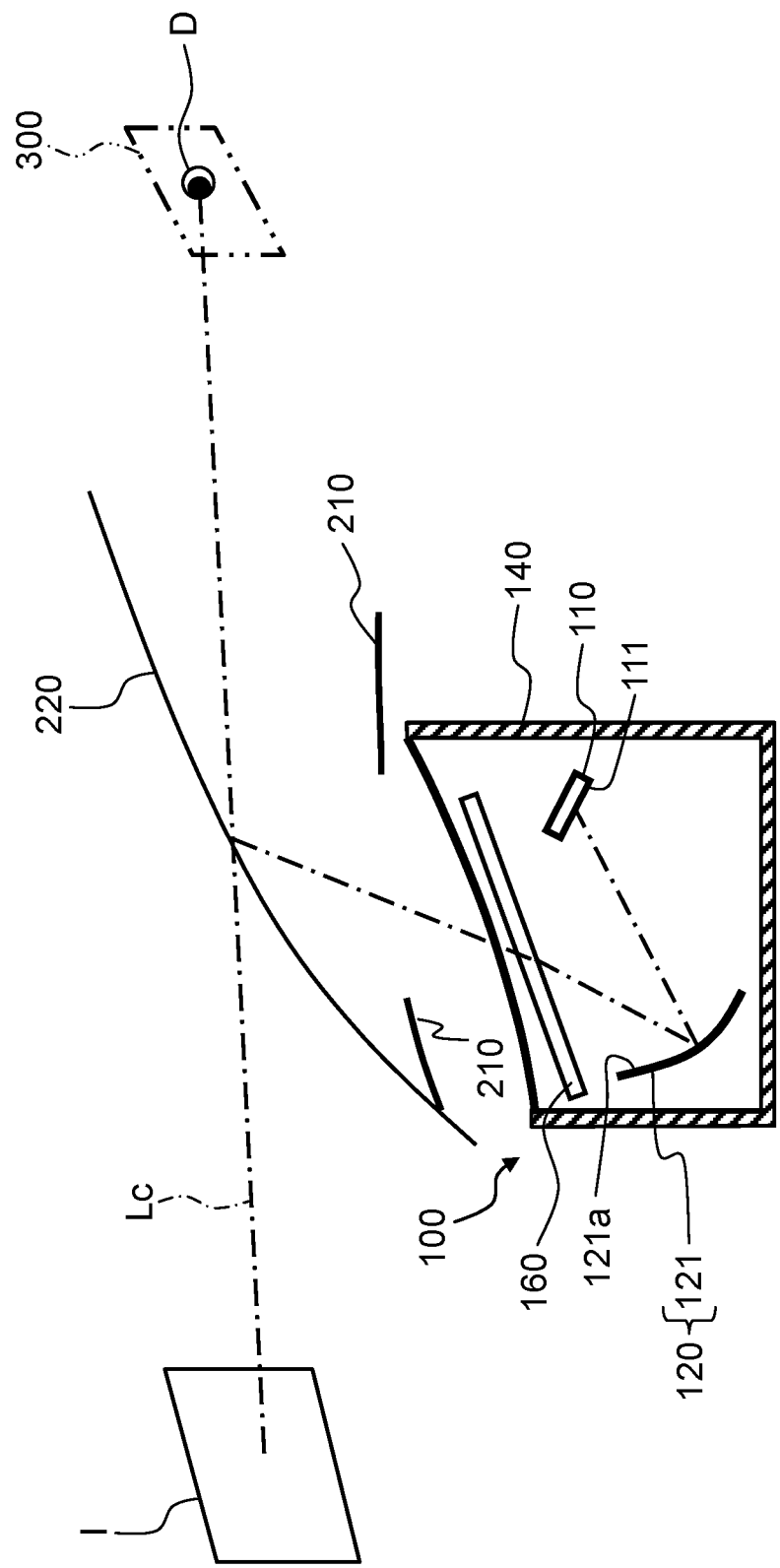
FIG. 7 is a schematic diagram illustrating a head-up display according to a fifth exemplary embodiment.

FIG. 7 is a schematic diagram illustrating head-up display 100 according to a fifth exemplary embodiment.

As illustrated in FIG. 7, projection optical system 120 includes first mirror 121. An image to be displayed on display surface 111 of display device 110 is reflected by first mirror 121, refracted through refractive optical system 160, and further reflected by windshield 220. Thereafter, the image reaches viewing area 300 for observer D and is viewed as virtual image I by observer D.

[5-1-2 Arrangement Configuration of Projection Optical System and Display Device]

Display device 110 is disposed horizontally vehicle rearward of first mirror 121 in housing 140. Display surface 111 of display device 110 is directed toward first mirror 121 and vertically downward. This prevents display surface 111 (liquid crystal surface) from being exposed to sunlight. Here, display device 110 is preferably disposed such that reference light beam Lc emitted from display surface 111 is inclined with respect to display surface 111. This prevents stray light caused by external light entering housing 140 and being reflected on display surface 111 of display device 110.

Reflective surface 121a of first mirror 121 is oriented in the direction in which an image displayed on display surface 111 is reflected in windshield 220. Reflective surface 121a of first mirror 121 is also eccentric so that the image displayed on display surface 111 is reflected in windshield 220.

First mirror 121 is a mirror whose reflective surface 121a has a concave shape and a free-form surface shape. Concave reflective surface 121a of first mirror 121 allows observer D to view virtual image I magnified as compared to an image to be displayed on display surface 111.

Other Exemplary Embodiments

As noted above, the first to fifth embodiments have been described as examples of the technique disclosed herein. However, the technique according to the present disclosure is not limited thereto and is applicable to embodiments in which modifications, substitutions, additions, omissions, etc., are made. Another embodiment could be achieved by combining the components described in the first to fifth embodiments.

NUMERICAL EXAMPLES

Numerical Examples 1 to 5, which embody the head-up displays according to the first to fourth embodiments, are described below. In tables of Numerical Examples 1 to 4, all lengths are in "mm" (millimeters) and all angles are in "°" (degrees). In the numerical examples, a free-form surface is defined by the following equations:

$$z = \frac{cr^2}{1+\sqrt{1-(1+k)c^2r^2}} + \sum_{m,n} C_j x^m y^n \quad \text{[Equation 1]}$$

$$(m \geq 0, n \geq 0, m+n > 0)$$

$$j = \frac{(m+n)^2 + m + 3n}{2} + 1 \quad \text{[Equation 2]}$$

Here, z is a sag at a position with coordinates (x, y) of axes defining a surface, r is a radius of curvature at the origin of the axes defining the surface, c is a curvature at the origin of the axes defining the surface, and k is a conic constant corresponding to polynomial coefficient $C_1$. $C_j$ (j>1) is a coefficient of monomial expression $x^m y^n$, where m and n are integers greater than or equal to zero.

Figure 8:
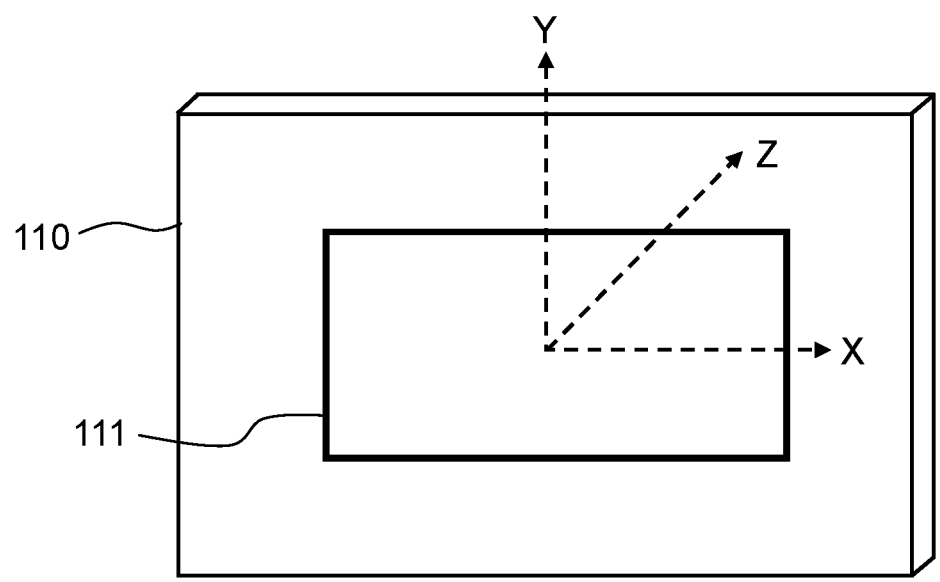
FIG. 8 is a diagram of the coordinate system of Numerical Examples 1 to 4 according to the first exemplary embodiment.

FIG. 8 is a diagram illustrating the coordinate system of Numerical Examples 1 to 4 according to the first exemplary embodiment. In Numerical Examples 1 to 4, a reference coordinate origin is the center of an image displayed on display surface 111, defining X, Y, Z axes as illustrated in FIG. 8.

Additionally, in eccentricity data in Numerical Examples 1 to 4, ADE refers to the amount by which a mirror is rotated about the X-axis from the Z-axis direction to the Y-axis direction. BDE refers to the amount by which a mirror is rotated about the Y-axis from the X-axis direction to the Z-axis direction. CDE refers to the amount by which a mirror is rotated about the Z-axis from the X-axis direction to the Y-axis direction.

Numerical Example 1

Table 1 shows configuration data of projection optical system 120 of Numerical Example 1, and Table 2 shows coefficients of polynomial free-form surfaces.

[Table 1]
[Table 2]

Numerical Example 2

Table 3 shows configuration data of projection optical system 120 of Numerical Example 2, and Table 4 shows coefficients of polynomial free-form surfaces.
[Table 3]
[Table 4]

Numerical Example 3

Table 5 shows configuration data of projection optical system 120 of Numerical Example 3, and Table 6 shows coefficients of a polynomial free-form surface.
[Table 5]
[Table 6]

Numerical Example 4

Table 7 shows configuration data of projection optical system 120 of Numerical Example 4, and Table 8 shows coefficients of a polynomial free-form surface.
[Table 7]
[Table 8]

The head-up display according to the present disclosure is suitable for a head-up display in which high image quality is required, such as, for example, a head-up display for use in a vehicle.

TABLE 1

| Surface No. | Shape | Eccentricity Data | | | | | |
|---|---|---|---|---|---|---|---|
| | | X | Y | Z | ADE | BDE | CDE |
| Display Surface | 1 | | 0 | 0 | 0 | 0 | 0 | 0 |
| First Mirror | 2 | Free-form Surface | −0.245 | −19.308 | 109.501 | −31.976 | 1.188 | −2.606 |
| Second Mirror | 3 | Free-form Surface | 1.568 | 21.100 | 80.108 | −87.291 | 2.819 | −0.506 |
| Windshield | 4 | Toroidal | −11.005 | −216.499 | −63.803 | −54.413 | −3.034 | −0.736 |
| Observer | 5 | | −81.869 | −384.158 | −841.435 | 13.847 | −4.800 | 9.924 |

| Surface No. | Radius of Curvature |
|---|---|
| 2 | −590.2 |
| 3 | 4668.5 |

| Surface No. | X Radius of Curvature | Y Radius of Curvature |
|---|---|---|
| 4 | −2600 | −4300 |

TABLE 2

| Surface No. | | Polynomial Coefficient | | | | | | |
|---|---|---|---|---|---|---|---|---|
| 2 | C1 | 0.00000E+00 | C19 | 0.00000E+00 | C37 | 0.00000E+00 | C55 | 0.00000E+00 |
| | C2 | 0.00000E+00 | C20 | 0.00000E+00 | C38 | 0.00000E+00 | C56 | 0.00000E+00 |
| | C3 | 0.00000E+00 | C21 | 0.00000E+00 | C39 | 0.00000E+00 | C57 | 0.00000E+00 |
| | C4 | −2.85570E−04 | C22 | 0.00000E+00 | C40 | 0.00000E+00 | C58 | 0.00000E+00 |
| | C5 | 3.15214E−05 | C23 | 0.00000E+00 | C41 | 0.00000E+00 | C59 | 0.00000E+00 |
| | C6 | −4.93034E−04 | C24 | 0.00000E+00 | C42 | 0.00000E+00 | C60 | 0.00000E+00 |
| | C7 | 2.25126E−07 | C25 | 0.00000E+00 | C43 | 0.00000E+00 | C61 | 0.00000E+00 |
| | C8 | 3.32820E−06 | C26 | 0.00000E+00 | C44 | 0.00000E+00 | C62 | 0.00000E+00 |
| | C9 | 1.93874E−06 | C27 | 0.00000E+00 | C45 | 0.00000E+00 | C63 | 0.00000E+00 |
| | C10 | 7.26124E−06 | C28 | 0.00000E+00 | C46 | 0.00000E+00 | C64 | 0.00000E+00 |
| | C11 | 6.88841E−10 | C29 | 0.00000E+00 | C47 | 0.00000E+00 | C65 | 0.00000E+00 |
| | C12 | 2.24171E−09 | C30 | 0.00000E+00 | C48 | 0.00000E+00 | C66 | 0.00000E+00 |
| | C13 | −1.46605E−08 | C31 | 0.00000E+00 | C49 | 0.00000E+00 | | |
| | C14 | −5.89482E−09 | C32 | 0.00000E+00 | C50 | 0.00000E+00 | | |
| | C15 | 1.41124E−08 | C33 | 0.00000E+00 | C51 | 0.00000E+00 | | |
| | C16 | 0.00000E+00 | C34 | 0.00000E+00 | C52 | 0.00000E+00 | | |
| | C17 | 0.00000E+00 | C35 | 0.00000E+00 | C53 | 0.00000E+00 | | |
| | C18 | 0.00000E+00 | C36 | 0.00000E+00 | C54 | 0.00000E+00 | | |
| 3 | C1 | 0.00000E+00 | C19 | 0.00000E+00 | C37 | 0.00000E+00 | C55 | 0.00000E+00 |
| | C2 | 0.00000E+00 | C20 | 0.00000E+00 | C38 | 0.00000E+00 | C56 | 0.00000E+00 |
| | C3 | 0.00000E+00 | C21 | 0.00000E+00 | C39 | 0.00000E+00 | C57 | 0.00000E+00 |
| | C4 | 5.31441E−04 | C22 | 0.00000E+00 | C40 | 0.00000E+00 | C58 | 0.00000E+00 |
| | C5 | −5.00228E−05 | C23 | 0.00000E+00 | C41 | 0.00000E+00 | C59 | 0.00000E+00 |
| | C6 | −1.91333E−04 | C24 | 0.00000E+00 | C42 | 0.00000E+00 | C60 | 0.00000E+00 |
| | C7 | 1.34339E−07 | C25 | 0.00000E+00 | C43 | 0.00000E+00 | C61 | 0.00000E+00 |
| | C8 | 6.12266E−07 | C26 | 0.00000E+00 | C44 | 0.00000E+00 | C62 | 0.00000E+00 |
| | C9 | 1.58718E−06 | C27 | 0.00000E+00 | C45 | 0.00000E+00 | C63 | 0.00000E+00 |
| | C10 | 3.51226E−06 | C28 | 0.00000E+00 | C46 | 0.00000E+00 | C64 | 0.00000E+00 |
| | C11 | −4.49786E−10 | C29 | 0.00000E+00 | C47 | 0.00000E+00 | C65 | 0.00000E+00 |
| | C12 | 2.52165E−09 | C30 | 0.00000E+00 | C48 | 0.00000E+00 | C66 | 0.00000E+00 |
| | C13 | −2.24280E−09 | C31 | 0.00000E+00 | C49 | 0.00000E+00 | | |
| | C14 | −1.74921E−09 | C32 | 0.00000E+00 | C50 | 0.00000E+00 | | |
| | C15 | 2.08500E−08 | C33 | 0.00000E+00 | C51 | 0.00000E+00 | | |
| | C16 | 0.00000E+00 | C34 | 0.00000E+00 | C52 | 0.00000E+00 | | |
| | C17 | 0.00000E+00 | C35 | 0.00000E+00 | C53 | 0.00000E+00 | | |
| | C18 | 0.00000E+00 | C36 | 0.00000E+00 | C54 | 0.00000E+00 | | |

TABLE 3

| Surface | | | Eccentricity Data | | | | | |
|---|---|---|---|---|---|---|---|---|
| | No. | Shape | X | Y | Z | ADE | BDE | CDE |
| Display Surface | 1 | | 0 | 0 | 0 | 0 | 0 | 0 |
| First Mirror | 2 | Free-form Surface | 21.690 | −47.566 | 135.249 | −44.294 | −14.947 | −11.590 |
| Second Mirror | 3 | Free-form Surface | −0.517 | 14.952 | 112.929 | −96.251 | −1.101 | −17.399 |
| Windshield | 4 | Toroidal | −91.155 | −291.389 | −34.731 | −62.272 | −13.415 | −21.310 |
| Observer | 5 | | −464.001 | −388.504 | −734.301 | 8.124 | −27.788 | 11.988 |

| Surface No. | Radius of Curvature |
|---|---|
| 2 | 930.7 |
| 3 | 561.7 |

| Surface No. | X Radius of Curvature | Y Radius of Curvature |
|---|---|---|
| 4 | −2600 | −4300 |

TABLE 4

| Surface No. | | Polynomial Coefficient | | | | | | |
|---|---|---|---|---|---|---|---|---|
| 2 | C1 | 0.00000E+00 | C19 | 3.43537E−10 | C37 | 0.00000E+00 | C55 | 0.00000E+00 |
| | C2 | 0.00000E+00 | C20 | 2.54005E−10 | C38 | 0.00000E+00 | C56 | 0.00000E+00 |
| | C3 | 0.00000E+00 | C21 | −9.54203E−10 | C39 | 0.00000E+00 | C57 | 0.00000E+00 |
| | C4 | −1.24217E−03 | C22 | −7.07046E−14 | C40 | 0.00000E+00 | C58 | 0.00000E+00 |

TABLE 4-continued

| Surface No. | | | Polynomial Coefficient | | | | |
|---|---|---|---|---|---|---|---|
| | C5 | 4.70706E−04 | C23 | 1.33665E−13 | C41 | 0.00000E+00 | C59 | 0.00000E+00 |
| | E− | −1.44271E−03 | C24 | −9.79282E−14 | C42 | 0.00000E+00 | C60 | 0.00000E+00 |
| | C7 | 3.07575E−07 | C25 | 1.04540E−12 | C43 | 0.00000E+00 | C61 | 0.00000E+00 |
| | C8 | 2.38044E−06 | C26 | 1.20102E−12 | C44 | 0.00000E+00 | C62 | 0.00000E+00 |
| | C9 | 3.05234E−06 | C27 | 2.50124E−12 | C45 | 0.00000E+00 | C63 | 0.00000E+00 |
| | C10 | 4.58830E−06 | C28 | 4.59976E−12 | C46 | 0.00000E+00 | C64 | 0.00000E+00 |
| | C11 | −2.73828E−10 | C29 | 0.00000E+00 | C47 | 0.00000E+00 | C65 | 0.00000E+00 |
| | C12 | 1.76566E−08 | C30 | 0.00000E+00 | C48 | 0.00000E+00 | C66 | 0.00000E+00 |
| | C13 | 7.43442E−09 | C31 | 0.00000E+00 | C49 | 0.00000E+00 | | |
| | C14 | 4.87738E−08 | C32 | 0.00000E+00 | C50 | 0.00000E+00 | | |
| | C15 | −3.10039E−08 | C33 | 0.00000E+00 | C51 | 0.00000E+00 | | |
| | C16 | 6.57075E−13 | C34 | 0.00000E+00 | C52 | 0.00000E+00 | | |
| | C17 | 1.19867E−10 | C35 | 0.00000E+00 | C53 | 0.00000E+00 | | |
| | C18 | 1.54768E−10 | C36 | 0.00000E+00 | C54 | 0.00000E+00 | | |
| 3 | C1 | 0.00000E+00 | C19 | 1.05993E−10 | C37 | 0.00000E+00 | C55 | 0.00000E+00 |
| | C2 | 0.00000E+00 | C20 | 3.33553E−10 | C38 | 0.00000E+00 | C56 | 0.00000E+00 |
| | C3 | 0.00000E+00 | C21 | −6.20298E−10 | C39 | 0.00000E+00 | C57 | 0.00000E+00 |
| | C4 | −3.23639E−04 | C22 | −9.41644E−14 | C40 | 0.00000E+00 | C58 | 0.00000E+00 |
| | C5 | 2.18328E−04 | C23 | 7.00912E−14 | C41 | 0.00000E+00 | C59 | 0.00000E+00 |
| | C6 | −9.38574E−04 | C24 | −4.99953E−15 | C42 | 0.00000E+00 | C60 | 0.00000E+00 |
| | C7 | 6.74843E−07 | C25 | 3.23238E−13 | C43 | 0.00000E+00 | C61 | 0.00000E+00 |
| | C8 | −4.20886E−08 | C26 | 1.21274E−12 | C44 | 0.00000E+00 | C62 | 0.00000E+00 |
| | C9 | 2.92925E−06 | C27 | 2.74584E−12 | C45 | 0.00000E+00 | C63 | 0.00000E+00 |
| | C10 | 1.37410E−06 | C28 | 8.98291E−13 | C46 | 0.00000E+00 | C64 | 0.00000E+00 |
| | C11 | −6.23358E−11 | C29 | 0.00000E+00 | C47 | 0.00000E+00 | C65 | 0.00000E+00 |
| | C12 | 8.94591E−09 | C30 | 0.00000E+00 | C48 | 0.00000E+00 | C66 | 0.00000E+00 |
| | C13 | −3.89638E−09 | C31 | 0.00000E+00 | C49 | 0.00000E+00 | | |
| | C14 | 3.56744E−08 | C32 | 0.00000E+00 | C50 | 0.00000E+00 | | |
| | C15 | −2.15222E−08 | C33 | 0.00000E+00 | C51 | 0.00000E+00 | | |
| | C16 | 3.27131E−12 | C34 | 0.00000E+00 | C52 | 0.00000E+00 | | |
| | C17 | 3.80313E−11 | C35 | 0.00000E+00 | C53 | 0.00000E+00 | | |
| | C18 | 6.11279E−11 | C36 | 0.00000E+00 | C54 | 0.00000E+00 | | |

TABLE 5

| Surface | | | Eccentricity Data | | | | | |
|---|---|---|---|---|---|---|---|---|
| | No. | Shape | X | Y | Z | ADE | BDE | CDE |
| Display Surface | 1 | | 0 | 0 | 0 | 0 | 0 | 0 |
| First Mirror | 2 | Free-form Surface | 0.000 | 38.823 | 144.889 | −4.000 | 0.904 | −1.802 |
| Second Mirror | 3 | Planar | 2.513 | 58.278 | 98.898 | −62.989 | 4.020 | −0.308 |
| Windshield | 4 | Toroidal | −13.700 | −221.632 | 31.084 | −36.775 | −1.433 | −0.734 |
| Observer | 5 | | −75.672 | −615.922 | −660.681 | 31.368 | −4.203 | 8.433 |

| Surface No. | Radius of Curvature |
|---|---|
| 2 | −525.1 |
| 3 | ∞ |

| Surface No. | X Radius of Curvature | Y Radius of Curvature |
|---|---|---|
| 4 | −2600 | −4300 |

TABLE 6

| Surface No. | | | Polynomial Coefficient | | | | |
|---|---|---|---|---|---|---|---|
| 2 | C1 | 0.00000E+00 | C19 | −1.99562E−10 | C37 | 0.00000E+00 | C55 | 0.00000E+00 |
| | C2 | 0.00000E+00 | C20 | 7.95802E−11 | C38 | 0.00000E+00 | C56 | 0.00000E+00 |
| | C3 | 0.00000E+00 | C21 | −2.95811E−09 | C39 | 0.00000E+00 | C57 | 0.00000E+00 |
| | C4 | −1.73944E−04 | C22 | 1.09857E−13 | C40 | 0.00000E+00 | C58 | 0.00000E+00 |
| | C5 | 1.26087E−04 | C23 | 1.71777E−14 | C41 | 0.00000E+00 | C59 | 0.00000E+00 |
| | C6 | 2.70038E−04 | C24 | −1.48989E−13 | C42 | 0.00000E+00 | C60 | 0.00000E+00 |

TABLE 6-continued

| Surface No. | | | Polynomial Coefficient | | | | |
|---|---|---|---|---|---|---|---|
| | C7 | 4.49636E−08 | C25 | 3.24641E−12 | C43 | 0.00000E+00 | C61 | 0.00000E+00 |
| | C8 | 2.69334E−07 | C26 | 4.37750E−12 | C44 | 0.00000E+00 | C62 | 0.00000E+00 |
| | C9 | −1.91072E−07 | C27 | 2.50031E−11 | C45 | 0.00000E+00 | C63 | 0.00000E+00 |
| | C10 | 1.80824E−06 | C28 | 6.28061E−11 | C46 | 0.00000E+00 | C64 | 0.00000E+00 |
| | C11 | −1.60538E−09 | C29 | 0.00000E+00 | C47 | 0.00000E+00 | C65 | 0.00000E+00 |
| | C12 | −1.66799E−09 | C30 | 0.00000E+00 | C48 | 0.00000E+00 | C66 | 0.00000E+00 |
| | C13 | −8.92884E−10 | C31 | 0.00000E+00 | C49 | 0.00000E+00 | | |
| | C14 | −2.66759E−08 | C32 | 0.00000E+00 | C50 | 0.00000E+00 | | |
| | C15 | −5.20157E−08 | C33 | 0.00000E+00 | C51 | 0.00000E+00 | | |
| | C16 | −3.70436E−12 | C34 | 0.00000E+00 | C52 | 0.00000E+00 | | |
| | C17 | 3.20147E−11 | C35 | 0.00000E+00 | C53 | 0.00000E+00 | | |
| | C18 | −3.00357E−11 | C36 | 0.00000E+00 | C54 | 0.00000E+00 | | |

TABLE 7

| | Surface | | Eccentricity Data | | | | | |
|---|---|---|---|---|---|---|---|---|
| | No. | Shape | X | Y | Z | ADE | BDE | CDE |
| Display Surface | 1 | | 0 | 0 | 0 | 0 | 0 | 0 |
| First Mirror | 2 | Planar | 0.000 | −54.940 | 117.820 | −53.179 | 1.619 | −3.018 |
| Second Mirror | 3 | Free-form Surface | 2.987 | 4.311 | 108.856 | −103.460 | 0.339 | −1.234 |
| Windshield | 4 | Toroidal | 14.270 | −228.689 | −60.835 | −58.993 | −7.294 | 2.717 |
| Observer | 5 | | −36.180 | −335.172 | −850.746 | 9.321 | −3.179 | 15.166 |

| Surface No. | Radius of Curvature |
|---|---|
| 2 | ∞ |
| 3 | 746.6 |

| Surface No. | X Radius of Curvature | Y Radius of Curvature |
|---|---|---|
| 4 | −2600 | −4300 |

TABLE 8

| Surface No. | | | Polynomial Coefficient | | | | |
|---|---|---|---|---|---|---|---|
| 3 | C1 | 0.00000E+00 | C19 | −1.99562E−10 | C37 | 0.00000E+00 | C55 | 0.00000E+00 |
| | C2 | 0.00000E+00 | C20 | 7.95802E−11 | C38 | 0.00000E+00 | C56 | 0.00000E+00 |
| | C3 | 0.00000E+00 | C21 | −2.95811E−09 | C39 | 0.00000E+00 | C57 | 0.00000E+00 |
| | C4 | −1.73944E−04 | C22 | 1.09857E−13 | C40 | 0.00000E+00 | C58 | 0.00000E+00 |
| | C5 | 1.26087E−04 | C23 | 1.71777E−14 | C41 | 0.00000E+00 | C59 | 0.00000E+00 |
| | C6 | 2.70038E−04 | C24 | −1.48989E−13 | C42 | 0.00000E+00 | C60 | 0.00000E+00 |
| | C7 | 4.49636E−08 | C25 | 3.24641E−12 | C43 | 0.00000E+00 | C61 | 0.00000E+00 |
| | C8 | 2.69334E−07 | C26 | 4.37750E−12 | C44 | 0.00000E+00 | C62 | 0.00000E+00 |
| | C9 | −1.91072E−07 | C27 | 2.50031E−11 | C45 | 0.00000E+00 | C63 | 0.00000E+00 |
| | C10 | 1.80824E−06 | C28 | 6.28061E−11 | C46 | 0.00000E+00 | C64 | 0.00000E+00 |
| | C11 | −1.60538E−09 | C29 | 0.00000E+00 | C47 | 0.00000E+00 | C65 | 0.00000E+00 |
| | C12 | −1.66799E−09 | C30 | 0.00000E+00 | C48 | 0.00000E+00 | C66 | 0.00000E+00 |
| | C13 | −8.92884E−10 | C31 | 0.00000E+00 | C49 | 0.00000E+00 | | |
| | C14 | −2.66759E−08 | C32 | 0.00000E+00 | C50 | 0.00000E+00 | | |
| | C15 | −5.20157E−08 | C33 | 0.00000E+00 | C51 | 0.00000E+00 | | |
| | C16 | −3.70436E−12 | C34 | 0.00000E+00 | C52 | 0.00000E+00 | | |
| | C17 | 3.20147E−11 | C35 | 0.00000E+00 | C53 | 0.00000E+00 | | |
| | C18 | −3.00357E−11 | C36 | 0.00000E+00 | C54 | 0.00000E+00 | | |

What is claimed is:

1. A head-up display comprising:
a display device having a display surface for displaying an image;
a projection optical system for projecting an image displayed on the display surface onto a viewing area for an observer;
a refractive optical system disposed in an optical path from the display surface to the viewing area and between the projection optical system and the viewing area;
a housing that has an opening and contains the display device, the projection optical system and the refractive optical system; and an opening cover that has at least partially a curved portion, and is disposed in the opening so that light emitted from the display surface is incident on a convex side of the curved portion, wherein an exit surface of the refractive optical system has a convex shape, wherein when a light beam that is emitted from a center of the display surface and reaches a center of the viewing area is referred to as a reference light beam, the head-up display satisfies the following condition (1):

$$L2 \leq L1 \tag{1}$$

where L1 is a distance from an end on an anterior side of the observer on a smaller curvature surface of the refractive optical system to the opening cover, and L2 is a distance from a position at which the reference light beam passes through the smaller curvature surface of the refractive optical system to the opening cover.

2. The head-up display according to claim 1, wherein the head-up display is installed in a vehicle having a windshield and satisfies the following condition (2):

$$L2 \leq L3 \tag{2}$$

where L3 is a distance from an end on a vehicle rearward side on the smaller curvature surface of the refractive optical system to the opening cover.

3. The head-up display according to claim 1, wherein the refractive optical system has a surface shape with a curvature in a longitudinal direction of a vehicle smaller than a curvature in a transverse direction of the vehicle.

4. The head-up display according to claim 1, wherein the refractive optical system has a rotationally asymmetric surface shape.

5. The head-up display according to claim 1, wherein intersection of a cross-section of the refractive optical system with an incident surface is referred to as an incident intersection line, intersection of the cross-section with an exit surface is referred to as an exit intersection line, the cross-section is perpendicular to the reference light beam, and the refractive optical system is disposed such that the reference light beam incident on the refractive optical system is inclined with respect to (i) a normal to the exit surface at a point on the exit intersection line and (ii) a normal to the incident surface at a point on the incident intersection line.

6. A vehicle comprising the head-up display according to claim 1.

* * * * *